United States Patent
Seok et al.

(10) Patent No.: US 10,529,972 B2
(45) Date of Patent: Jan. 7, 2020

(54) SEPARATOR FOR RECHARGEABLE LITHIUM BATTERY AND RECHARGEABLE LITHIUM BATTERY INCLUDING SAME

(71) Applicant: SAMSUNG SDI CO., LTD., Yongin-si, Gyeonggi-do (KR)

(72) Inventors: Hoon Seok, Yongin-si (KR); Jong-Hwan Park, Yongin-si (KR); Jung-Hyun Nam, Yongin-si (KR); Eon-Mi Lee, Yongin-si (KR); Yeon-Joo Choi, Yongin-si (KR); Ae-Hui Goh, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 0 days.

(21) Appl. No.: 14/855,304

(22) Filed: Sep. 15, 2015

(65) Prior Publication Data
US 2016/0141579 A1    May 19, 2016

(30) Foreign Application Priority Data

Nov. 19, 2014    (KR) .................. 10-2014-0161933

(51) Int. Cl.
*H01M 2/14*    (2006.01)
*H01M 2/16*    (2006.01)
*H01M 10/052*    (2010.01)

(52) U.S. Cl.
CPC ......... *H01M 2/1686* (2013.01); *H01M 2/162* (2013.01); *H01M 2/1633* (2013.01); *H01M 2/1646* (2013.01); *H01M 2/1653* (2013.01); *H01M 10/052* (2013.01)

(58) Field of Classification Search
CPC .............................. H02J 7/00; H01M 10/0568
See application file for complete search history.

(56) References Cited

U.S. PATENT DOCUMENTS

| | | | | | |
|---|---|---|---|---|---|
| 5,453,333 | A | * | 9/1995 | Takauchi | H01M 2/1653 429/142 |
| 6,432,586 | B1 | * | 8/2002 | Zhang | H01M 2/164 429/231.95 |

(Continued)

FOREIGN PATENT DOCUMENTS

| | | |
|---|---|---|
| CN | 103247770 A | 8/2013 |
| EP | 2 639 854 A1 | 9/2013 |

(Continued)

OTHER PUBLICATIONS

EPO Search Report dated Nov. 3, 2015, for corresponding European Patent application 15184161.6, (9 pages).

(Continued)

*Primary Examiner* — Lucas J. O'Donnell
(74) *Attorney, Agent, or Firm* — Lewis Roca Rothgerber Christie LLP

(57) ABSTRACT

A separator for a rechargeable lithium battery includes a substrate; an organic layer on at least one side of the substrate and including an organic material; and an inorganic layer on at least one side of the substrate and including an inorganic material, where the organic material includes two or more organic particles having respective melting points that are different from each other. A rechargeable lithium battery includes the separator.

8 Claims, 4 Drawing Sheets

(56) References Cited

U.S. PATENT DOCUMENTS

| | | | |
|---|---|---|---|
| 2009/0269672 A1* | 10/2009 | Takita | B01D 67/002 |
| | | | 429/254 |
| 2009/0325058 A1 | 12/2009 | Katayama et al. | |
| 2010/0159314 A1* | 6/2010 | Kim | H01M 2/1673 |
| | | | 429/120 |
| 2011/0183203 A1* | 7/2011 | Du | B82Y 30/00 |
| | | | 429/217 |
| 2011/0311855 A1* | 12/2011 | Peng | H01M 2/1653 |
| | | | 429/144 |
| 2013/0017430 A1* | 1/2013 | Terakawa | B32B 27/32 |
| | | | 429/144 |
| 2013/0244080 A1 | 9/2013 | Song et al. | |
| 2014/0212727 A1 | 7/2014 | Hying et al. | |
| 2014/0322587 A1* | 10/2014 | Lai | H01M 2/166 |
| | | | 429/145 |

FOREIGN PATENT DOCUMENTS

| | | |
|---|---|---|
| EP | 2 838 137 A1 | 2/2015 |
| JP | 2001-319634 A | 11/2001 |
| JP | 2011-198532 A | 10/2011 |
| JP | 2013-197100 A | 9/2013 |
| KR | 10-2005-0035281 A | 4/2005 |
| KR | 10-2008-0106881 A | 12/2008 |
| KR | 10-2010-0113030 A | 10/2010 |
| KR | 10-2012-0026296 A | 3/2012 |
| KR | 10-1276906 B1 | 6/2013 |
| WO | WO 2008/143005 A1 | 11/2008 |

OTHER PUBLICATIONS

EPO Office Action dated Feb. 2, 2017, for corresponding European Patent Application No. 15184161.6 (4 pages).

Chinese Office Action, with English translation, dated Mar. 21, 2019, for corresponding Chinese Patent Application No. 201510761733.1, (13 pages).

Chinese Patent Second Office Action with English Translation for corresponding Chinese Patent Application No. 201510761733.1, dated Sep. 30, 2019, 9 pages.

Japanese Patent Office Action for corresponding Japanese Patent Application No. 2015-204445, dated Oct. 15, 2019, 3 pages.

* cited by examiner

SEPARATOR FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2014-0161933 filed in the Korean Intellectual Property Office on Nov. 19, 2014, the entire contents of which are incorporated herein by reference.

BACKGROUND

1. Field

A separator for a rechargeable lithium battery and a rechargeable lithium battery including the same are disclosed.

2. Description of the Related Art

A rechargeable lithium battery includes a positive electrode, a negative electrode and a separator interposed between the positive and negative electrodes.

The separator includes micropores through which lithium ions are passed and play a role of electrically insulating the positive and negative electrodes from each other. In addition, the separator shuts down the battery when the battery temperature goes above or over a predetermined or set temperature and thus, plays a role of preventing the battery from being overheated (or reducing a likelihood or amount of such overheating).

However, such a separator has a limit in that it does not perform insulation functions between the positive electrode and the negative electrode and/or shut-down functions suitably or sufficiently as a result of heat generated previously and thermal runaway of a battery.

SUMMARY

One aspect of an embodiment provides a separator for a rechargeable lithium battery that suppresses or reduces exothermicity of a battery earlier and prevents or reduces a short circuit between positive and negative electrodes and thus, having improved safety.

In another embodiment, a rechargeable lithium battery includes the separator for a rechargeable lithium battery.

In one embodiment, a separator for a rechargeable lithium battery includes: a substrate; an organic layer on at least one side of the substrate and including an organic material; and an inorganic layer on at least one side of the substrate and including an inorganic material, wherein the organic material includes two or more organic particles having respective melting points that are different from each other.

One of the melting points of the organic material may be lower than that of the substrate.

The melting point of the substrate may be about 135° C. to about 140° C.

One of the melting points of the organic material may be about 100° C. to about 130° C.

The two or more organic particles may include a first organic particle and a second organic particle, the melting point of the second particle being different from that of the first organic particle, and a melting point difference between the first organic particle and the second organic particle may be about 10° C. to about 20° C.

The organic material may include a polyolefin, a polyolefin derivative, a polyolefin wax, an acryl-based compound, or a mixture thereof.

The organic material may have a particle size of about 0.1 μm to about 5 μm.

The inorganic material may include an inorganic particle including $SiO_2$, $Al_2O_3$, $Al(OH)_3$, $AlO(OH)$, $TiO_2$, $BaTiO_2$, $ZnO_2$, $Mg(OH)_2$, $MgO$, $Ti(OH)_4$, aluminum nitride (AlN), silicon carbide (SiC), boron nitride (BoN), or a mixture thereof.

The inorganic material may have a particle size of about 0.1 μm to about 5 μm.

The inorganic layer may have a thickness of about 1 μm to about 10 μm, and the organic layer may have a thickness of about 1 μm to about 10 μm.

At least one selected from the organic layer and the inorganic layer may further include a binder, and the binder may include a styrene-butadiene rubber (SBR), carboxylmethyl cellulose (CMC), polyvinylidene fluoride (PVdF), a polyvinylidene fluoride-hexafluoropropylene (PVdF-HFP) copolymer, ethylene vinylacetate (EVA), hydroxyethyl cellulose (HEC), polyvinyl alcohol (PVA), polyvinylbutyral (PVB), an ethylene-acrylic acid copolymer, acrylonitrile, a vinyl acetate derivative, polyethylene glycol, an acryl-based rubber, or a mixture thereof.

In another embodiment, a rechargeable lithium battery includes the separator.

Other embodiments are included in the following detailed description.

A rechargeable lithium battery having improved safety may be realized by applying the separator, thereby suppressing or reducing exothermicity earlier and preventing or reducing a short circuit between positive and negative electrodes.

BRIEF DESCRIPTION OF THE DRAWINGS

The accompanying drawings, together with the specification, illustrate embodiments of the present invention, and, together with the description, serve to explain the principles of the present invention.

DETAILED DESCRIPTION

Figure 1:
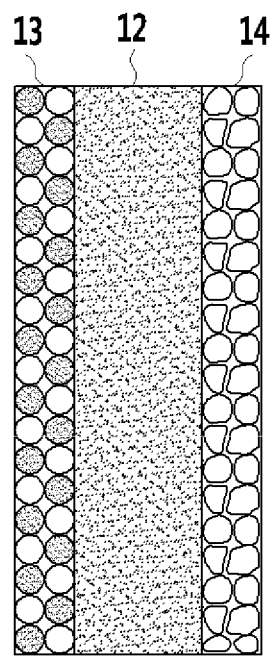
FIG. 1 is a schematic view showing a structure of a separator for a rechargeable lithium battery according to one embodiment.

Hereinafter, certain embodiments are described in detail. However, these embodiments are exemplary, and this disclosure is not limited thereto.

As used herein, when a specific definition is not otherwise provided, it will be understood that when an element such as a surface, layer, or film is referred to as being "on" another element, it can be directly on the other element or indirectly on the other element (e.g., intervening elements may also be present). Also, expressions such as "at least one of," when preceding a list of elements, modify the entire list of elements and do not modify the individual elements of the list. Further, the use of "may" when describing embodiments of the present invention refers to "one or more embodiments of the present invention."

Hereinafter, a separator for a rechargeable lithium battery according to one embodiment is described.

The separator for a rechargeable lithium battery according to the present embodiment includes a substrate, an organic layer positioned on at least one side of the substrate, and an inorganic layer positioned on at least one side of the substrate. The organic layer includes an organic material, and the inorganic layer includes an inorganic material. The organic material includes two or more kinds of organic particles having different melting points from each other.

A separator is positioned between positive and negative electrodes and plays a role of preventing a direct short circuit between the electrodes and passing lithium ions through micropores in itself (or reduces a likelihood or amount of such a short circuit). This separator blocks the micropores through a shut-down function and thus, controls movement of the lithium ions when a battery becomes exothermic abnormally beyond a predetermined or set temperature. Thereby, internal resistance of the battery sharply becomes increased, and thus, the separator may suppress or reduce an electrochemical reaction and additional exothermicity of the battery.

According to one embodiment, the shut-down function of a substrate itself in the separator may be reinforced by forming an organic layer including an organic material on one side or two (both) sides of the substrate to lower a temperature at which the shut-down function starts. Furthermore, the shut-down function of the substrate may be further reinforced by using two or more kinds of organic particles (e.g., two or more different organic particles) having different melting points from each other and thus, sequentially lowering a shut-down temperature in a multi-stage process having a first stage and a second stage to reinforce shut-down functions of the substrate.

Embodiments of the shut-down functions in the multi-stage process are described as follows. For example, when a polyethylene substrate is used (e.g., used without organic materials disclosed herein), shut-down may start (begin) at about 135° C. Whereas when two kinds of organic materials (e.g., two different organic materials) each having a melting point of for example about 110° C. and about 120° C. are used on the substrate, shut-down may start (begin) at the melting point of the organic material having the lower melting point, for example, 110° C. of a first organic material having the lowest melting point, and thereby the organic material melts (e.g., is molten) to block pores of the substrate and to increase resistance of the battery, and exothermic retardation and interruption of an electrochemical reaction may occur. Nevertheless, in some instances, abnormal exothermicity continues, a temperature of a battery increases, and shut-down may start again at the melting point of the organic material having a higher melting point, for example, around 120° C. of a second organic material having the higher melting point, and resultantly shut-down of a substrate may occur subsequently in a multi-stage process. This may cause early resistance increase rather than a single shut-down (e.g., shut-down in a single stage), and thus an electrochemical reaction and exothermic acceleration may be blocked or reduced at each stage (e.g., each stage of the multi-stage process). In this way, the separator having an embodiment of the structure reinforces shut-down functions and thereby exothermicity of a battery may be suppressed or reduced earlier (e.g., at a lower temperature) as compared to a battery that does not include a separator including the organic material.

In addition, according to one embodiment, an inorganic layer including an inorganic material is also formed on one side or both sides of the substrate of the separator, and thus, may lower a temperature at which the separator melts (e.g., is molten) as a result of exothermicity of the battery and thereby prevent or reduce contraction of the separator. Accordingly, a short circuit between positive and negative electrodes may be prevented (or a likelihood or amount of a short circuit may be reduced), and additional exothermicity due to contraction of the separator may be suppressed or reduced.

Accordingly, the separator having an organic layer including two or more kinds of organic particles having different melting points from each other on at least one side of a substrate and also, an inorganic layer including an inorganic material on at least one side of the substrate according to one embodiment is reinforced with a shut-down function and may suppress or reduce exothermicity of a battery earlier (e.g., at a lower temperature), as compared to a battery that does not include a separator including the organic material, and thus, prevent or reduce thermal contraction between positive and negative electrodes and suppress or reduce a short circuit therebetween (or reduce a likelihood or amount of such short circuit), and resultantly, improve safety of a rechargeable lithium battery.

The separator includes the substrate, the organic layer and the inorganic layer and has no particular limit to its structure. For example, both the organic layer and the inorganic layer may be formed on only one side of the substrate or on two (both) sides thereof, and herein, the order of the organic layer and the inorganic layer has no particular limit. In addition, both the organic layer and the inorganic layer may be formed on one side (e.g., surface) of the substrate, and the organic layer or the inorganic layer may be formed on the other side (e.g., surface) of the substrate. Furthermore, the organic layer may be formed on one side (e.g., surface) of the substrate, while the inorganic layer may be formed on the other side (e.g., surface) of the substrate.

Figure 2:
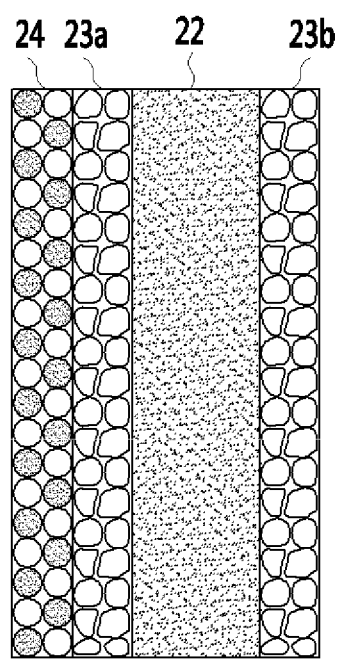
FIG. 2 is a schematic view showing a structure of a separator for a rechargeable lithium battery according to another embodiment.

Understanding of the structure of the separator may be facilitated by referring to the embodiments shown in FIGS. 1 and 2.

FIG. 1 is a schematic view showing a structure of a separator for a rechargeable lithium battery according to one embodiment, and FIG. 2 is a schematic view showing a structure of a separator for a rechargeable lithium battery according to another embodiment.

Referring to FIG. 1, a separator 10 according one embodiment has a structure including a substrate 12, an organic layer 13 positioned on one side of the substrate 12 and an inorganic layer 14 positioned on the other side of the substrate 12. Referring to FIG. 2, a separator 20 according to another embodiment may include a substrate 22, inorganic layers 23a and 23b on both sides of the substrate 22, respectively, and an organic layer 24 on the inorganic layer 23a of the inorganic layers 23a and 23b.

The substrate may include a polyolefin-based resin. The polyolefin-based resin may be, for example, a polyethylene-based resin, a polypropylene-based resin or a combination thereof.

The substrate may include a pore or pores. Lithium ions may move through the pore or pores. The substrate blocks the pore through a shut-down function when a battery is in an exothermic condition and thus, may increase internal resistance and suppress or reduce an electrochemical reaction.

The pore may have an average size of about 0.01 µm to about 1 µm, and, for example, about 0.02 µm to about 0.1 µm. The average size of the pore may be measured by using a porometer. In addition, the substrate may have a porosity of about 30 volume % to about 60 volume %, and, for example, about 35 volume % to about 50 volume %. When the substrate has a pore size and porosity within any of the foregoing ranges, the substrate may have a regular porous shape unlike a non-woven fabric having an irregular porous shape in which a pore size and porosity are larger than the foregoing ranges. In addition, when the pore size and porosity are within any of the foregoing ranges, performance and safety of a rechargeable lithium battery may be secured by preventing an internal short circuit due to formation of lithium dendrite (or reducing a likelihood or amount of such short circuit) and minimizing or reducing movement resistance of lithium ions.

The substrate may have a thickness of about 6 µm to about 25 µm, and, for example, about 7 µm to about 20 µm. When the substrate has a thickness within any of the foregoing ranges, excellent safety of a rechargeable lithium battery due to excellent physical characteristics as well as battery capacity may be secured.

The organic material forming the organic layer may include two or more kinds of organic particles having different melting points from each other more than two kinds of organic particle having a different particle size. The organic material may have a lower melting point than that of the substrate. In some embodiments, the melting point of the organic particle of the organic material having the highest melting point may be lower than the melting point of the substrate. For example, the substrate may have a melting point of about 135° C. to about 140° C., while the organic material may have a melting point of about 100° C. to about 130° C. Accordingly, the organic material is melted at a lower temperature (e.g., about 100° C. to about 130° C.) than the temperature at which the substrate melts, and thus, the organic material shuts down a battery and may suppress or reduce electrochemical reactivity at a lower temperature and resultantly, suppress exothermicity of the battery earlier (e.g., earlier or at a lower temperature than a separator that does not include the organic material).

For example, the organic material may include a first organic particle and a second organic particle having a different melting point than that of the first organic particle. A melting point difference between the first organic particle and the second organic particle may range from about 10° C. to about 20° C., for example, about 13° C. to about 20° C. When the two organic particles have melting point difference within any of the foregoing ranges, the multi-stage shut-down functions may be performed well. For example, the first organic particle having the lower melting point performs a shut down function and then the second organic particle having the higher melting point performs a further shut down function, and thereby a thermal runaway phenomenon may be suitably or easily controlled, and exothermicity of the battery may be suppressed or reduced earlier (e.g., at a lower temperature), as compared to a battery that does not include a separator including the organic material, while ensuring safety of the battery.

The first organic particle and the second organic particle may be mixed to a weight ratio of about 10:90 to about 90:10, and, for example, about 20:80 to about 80:20. When the first organic particle and the second organic particle are mixed within any of the foregoing weight ratio ranges, the multi-stage shut-down functions may be performed well, and exothermicity of the battery may be suppressed or reduced earlier (e.g., at a lower temperature), as compared to a battery that does not include a separator including the organic material, while ensuring safety of the battery.

The organic material may include polyolefin, a polyolefin derivative, polyolefin wax, an acryl-based compound, or a combination thereof. The polyolefin may be, for example, polyethylene, polypropylene or a combination thereof. For example, polyethylene may be used.

The organic material may have a weight average molecular weight of about 300 g/mol to about 10,000 g/mol, and, for example, about 2,000 g/mol to about 6,000 g/mol. When the organic material has a weight average molecular weight within any of the foregoing ranges, battery performance may be secured by minimizing or reducing movement resistance of lithium ions, and exothermicity of the battery may be suppressed or reduced earlier (e.g., at a lower temperature), as compared to a battery that does not include a separator including the organic material, by reinforcing the shut-down function of the separator.

The organic material may have a particle size of about 0.1 µm to about 5 µm, and, for example, about 0.2 µm to about 3 µm. When the organic material has a particle size within any of the foregoing ranges, the shut-down function of the separator may be further reinforced, and thus, exothermicity of a battery may be suppressed or reduced earlier (e.g., at a lower temperature), as compared to a battery that does not include a separator including the organic material. The particle size refers to a diameter of a particle when the organic material has a spherical or substantially spherical shape, and the particle size refers to the longest diameter of a particle when the organic material has a sheet-shape or non-shape (e.g., an amorphous shape).

The organic particle of the organic material may have a sheet-shape, a spherical or substantially spherical shape, a non-shape (e.g., an amorphous shape), or a combination thereof.

The organic layer may have a thickness of about 1 µm to about 10 µm, for example, about 2 µm to about 9 µm, or about 2 µm to about 8 µm. When the organic layer has a thickness within any of the foregoing ranges, the shut-down function of a separator may be further reinforced, and thus, exothermicity of a battery may be suppressed or reduced earlier (e.g., at a lower temperature), as compared to a battery that does not include a separator including the organic material.

The organic layer may further include a binder in addition to the organic material.

The binder may be a material that is different from the organic material, and may be, for example, a styrene-butadiene rubber (SBR), carboxylmethyl cellulose (CMC), polyvinylidene fluoride (PVdF), polyvinylidene fluoride-hexafluoropropylene (PVdF-HFP) copolymer, ethylene vinylacetate (EVA), hydroxyethyl cellulose (HEC), polyvinyl alcohol (PVA), polyvinylbutyral (PVB), ethylene-acrylic acid copolymer, acrylonitrile, a vinyl acetate derivative, polyethylene glycol, an acryl-based rubber, or a combination thereof.

The organic material may be included in the organic layer in an amount of about 70 wt % to about 99 wt %, and, for example, about 80 wt % to about 98 wt % based on the total amount of the organic layer, for example, the total amount of the organic material and the binder. When the organic material is included within any of the foregoing ranges, the shut-down function of the separator may be further reinforced, and thus, exothermicity of a battery may be suppressed or reduced earlier (e.g., at a lower temperature) as compared to a battery that does not include a separator including the organic material.

The inorganic material of the inorganic layer may be an inorganic particle including $SiO_2$, $Al_2O_3$, $Al(OH)_3$, $AlO(OH)$, $TiO_2$, $BaTiO_2$, $ZnO_2$, $Mg(OH)_2$, $MgO$, $Ti(OH)_4$, aluminum nitride (AlN), silicon carbide (SiC), boron nitride (BoN), or a combination thereof.

The inorganic material may have a particle size of about 0.1 µm to about 5 µm, and, for example, about 0.3 µm to about 1 µm. When the inorganic material has a particle size within any of the foregoing ranges, the inorganic material may be uniformly or substantially uniformly coated on the substrate, a short circuit between positive and negative electrodes may be suppressed by further preventing or reducing thermal contraction of a separator, and also, performance of a rechargeable lithium battery may be secured by minimizing or reducing resistance of lithium ions. Herein, the particle size refers to a diameter when the inorganic material has a spherical or substantially spherical shape and the longest diameter when the inorganic material has a sheet-shape or a non-shape (e.g., an amorphous shape).

The inorganic material may have a sheet-shape, a spherical or substantially spherical shape, a non-shape (e.g., an amorphous shape) or a combination thereof. For example, the inorganic material may have a non-shape (e.g., an amorphous shape). When the non-shaped particle (e.g., the amorphous shaped particle) is used, performance of a rechargeable lithium battery may be secured by minimizing or reducing resistance of lithium ions due to short tortuosity relative to that of the sheet-shaped particle.

The inorganic layer may have a thickness of about 1 µm to about 10 µm, and, for example, about 2 µm to about 7 µm. When the inorganic layer has a thickness within any of the foregoing ranges, thermal contraction of the separator may be further prevented or reduced, and thus, a short circuit between positive and negative electrodes may be suppressed or reduced.

The inorganic layer may further include a binder in addition to the inorganic material. The binder is the same or substantially the same as the binder of the organic layer.

The inorganic material may be included in the inorganic layer in an amount of about 70 wt % to about 99 wt %, and, for example, about 80 wt % to about 98 wt % based on the total amount of the inorganic layer, for example, the total amount of the inorganic material and the binder. When the inorganic material is included within any of the foregoing ranges, a short circuit between positive and negative electrodes may be suppressed or reduced by further preventing or reducing thermal contraction of a separator. In addition, an internal short circuit due to a lithium dendrite or a foreign particle may be prevented (or a likelihood or amount of such a short circuit may be reduced), or battery safety may be secured by forming an electrical insulation layer.

Hereinafter, the rechargeable lithium battery including above separator will be described with reference to FIG. 3.

Figure 3:
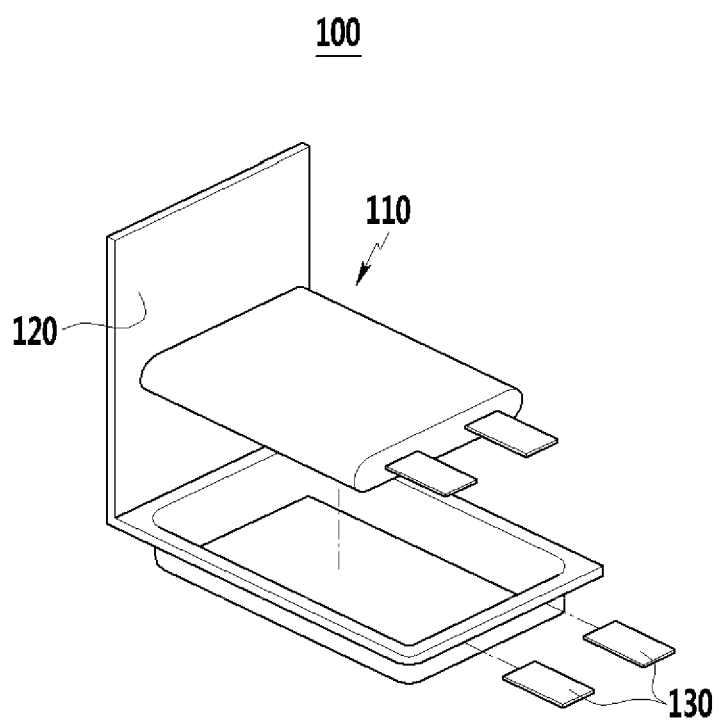
FIG. 3 is a schematic view showing a rechargeable lithium battery according to one embodiment.

FIG. 3 is a schematic view of a rechargeable lithium battery according to one embodiment of the present invention.

Referring to FIG. 3, a rechargeable lithium battery 100 according to one embodiment includes an electrode assembly 110, a battery case 120 housing the electrode assembly 110, and an electrode tab 130 electrically channeling a current generated from the electrode assembly 110 to the outside. The battery case 120 is sealed by overlapping the two sides facing each other. In addition, an electrolyte solution is injected inside the battery case 120 housing the electrode assembly 110.

The electrode assembly 110 includes a positive electrode, a negative electrode facing the positive electrode, a separator interposed between the positive electrode and the negative electrode.

The separator is the same or substantially the same as described above.

The positive electrode may include a current collector and a positive active material layer on the current collector.

The current collector may be aluminum, but it is not limited thereto.

The positive active material layer includes a positive active material.

The positive active material includes a compound (e.g., a lithiated intercalation compound) being capable of intercalating and deintercalating lithium, for example, a lithium metal compound.

The lithium metal compound may include an oxide, oxides or a phosphate including, for example, at least one metal selected from cobalt, manganese, nickel and aluminum, and lithium. For example, compounds represented by one of the following chemical formulae may be used.

$Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0.90 \le a \le 1.8$, $0 \le b \le 0.5$, $0 \le c \le 0.05$); $Li_aE_{2-b}X_bO_{4-c}D_c$ ($0.90 \le a \le 1.8$, $0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.05$, $0 < \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Co_bX_cO_{2-\alpha}T_2$ ($0.90 \le a \le 1.8$, $0 \le b \le 0.5$, $0 \le c \le 0.05$, $0 < \alpha < 2$); $Li_aNi_{1-b-c}Mn_bX_cD_\alpha$ ($0.90 \le a \le 1.8$, $0 \le b \le 0.5$, $0 \le c \le 0.05$, $0 < \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 < a < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$ In the foregoing chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The positive active material layer may include a binder and, optionally, a conductive material in addition to the positive active material.

The binder improves binding properties of the positive active material particles to each other and to a current collector. Examples of the binder include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but the binder is not limited thereto.

The conductive material provides an electrode with conductivity. Any suitable, electrically conductive material may be used as a conductive material unless it causes a chemical change in the battery. Examples of the conductive material include a carbon-based material such as natural graphite, artificial graphite, carbon black, acetylene black, ketjen black, carbon fiber and the like; a metal-based material such as a metal powder or a metal fiber and the like of copper, nickel, aluminum, silver, and the like; a conductive polymer such as a polyphenylene derivative and the like; or a mixture thereof.

The negative electrode includes a current collector and a negative active material layer disposed on the current collector.

The current collector may be a copper foil, but it is not limited thereto.

The negative active material layer includes a negative active material, a binder and, optionally, a conductive material.

The negative active material may include a material that reversibly intercalates/deintercalates lithium ions, a lithium metal, a lithium metal alloy, a material being capable of doping and dedoping lithium, or a transition metal oxide.

The material that can reversibly intercalate/deintercalate lithium ions includes a carbon material. The carbon material may be any suitable, carbon-based negative active material available in the art of lithium ion rechargeable batteries. Examples of the carbon material include crystalline carbon, amorphous carbon, and mixtures thereof. The crystalline carbon may be non-shaped (e.g., amorphous shaped), or sheet, flake, spherical, substantially spherical, or fiber shaped natural graphite or artificial graphite. The amorphous carbon may be a soft carbon, a hard carbon, a mesophase pitch carbonization product, fired coke, or the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may include Si, $SiO_x$ ($0<x<2$), a Si—C composite, a Si-Q alloy (wherein Q is an alkali metal, an alkaline-earth metal, Group 13 to Group 16 elements, a transition metal, a rare earth element, or a combination thereof, and not Si), Sn, $SnO_2$, a Sn—C composite, Sn—R (wherein R is an alkali metal, an alkaline-earth metal, Group 13 to Group 16 elements, a transition metal, a rare earth element, or a combination thereof, and not Sn), and the like. At least one of the foregoing materials may be mixed with $SiO_2$. The elements Q and R may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may include vanadium oxide, lithium vanadium oxide, or the like.

The binder improves binding properties of negative active material particles with one another and with a current collector. Examples of the binder include a non-water-soluble binder, a water-soluble binder, or a combination thereof.

The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkali metal salts thereof. The alkali metal may be Na, K, or Li. Such a thickener may be included in an amount of about 0.1 parts by weight to about 3 parts by weight based on 100 parts by weight of the negative active material.

The conductive material is included to improve electrode conductivity. Any suitable, electrically conductive material may be used as a conductive material unless it causes a chemical change in the battery. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver and the like; a conductive polymer such as a polyphenylene derivative; or a mixture thereof.

The positive electrode and the negative electrode may be respectively manufactured by mixing each active material, the binder and the conductive material in a solvent to prepare slurry, and coating the slurry on the current collector. Herein, the solvent may be N-methylpyrrolidone, and the like, and an aqueous solvent such as water and the like may be used according to the kind of the binder, but the solvent is not limited thereto.

The electrolyte solution includes a non-aqueous organic solvent and a lithium salt.

The non-aqueous organic solvent serves as a medium for transmitting ions taking part in the electrochemical reaction of a battery. The non-aqueous organic solvent may be selected from a carbonate-based, ester-based, ether-based, ketone-based, alcohol-based and aprotic solvent.

The carbonate-based solvent may be, for example dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), or the like.

When the carbonate-based solvent is prepared by mixing a cyclic carbonate and a linear carbonate, a solvent having a low viscosity while having an increased dielectric constant may be obtained. The cyclic carbonate and the linear carbonate may be mixed together to a volume ratio of about 1:1 to 1:9.

The ester-based solvent may include, for example methyl acetate, ethyl acetate, n-propyl acetate, dimethyl acetate, methyl propionate, ethyl propionate, γ-butyrolactone, decanolide, valerolactone, mevalonolactone, caprolactone, or the like. The ether-based solvent may include, for example dibutylether, tetraglyme, diglyme, dimethoxyethane, 2-methyltetrahydrofuran, tetrahydrofuran, and the like, and the ketone-based solvent may include cyclohexanone, and the like. The alcohol-based solvent may include ethanol, isopropyl alcohol, and the like.

The non-aqueous organic solvent may be used singularly or in a mixture. When the organic solvent is used in a mixture, the mixture ratio can be controlled in accordance with a suitable or desirable battery performance.

The non-aqueous electrolyte solution may further include an overcharge-inhibiting additive such as ethylene carbonate, pyrocarbonate, and like.

The lithium salt dissolved in the non-aqueous organic solvent supplies lithium ions in the battery, and operates a basic operation of a rechargeable lithium battery and improves lithium ion transportation between positive and negative electrodes.

Examples of the lithium salt may include one selected from $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)$ $(C_yF_{2y+1}SO_2)$ (wherein x and y are natural numbers), LiCl, LiI, $LiB(C_2O_4)_2$ (lithium bis(oxalato) borate; LiBOB), and a combination thereof.

The lithium salt may be used at a concentration of about 0.1 M to about 2.0 M. When the lithium salt is included at the above concentration range, an electrolyte solution may have excellent performance and lithium ion mobility due to appropriate conductivity and viscosity of an electrolyte solution.

Hereinafter, embodiments of the present disclosure are described with reference to examples. However, these examples are exemplary, and the present disclosure is not limited thereto.

Furthermore, what is not described in this disclosure may be sufficiently understood by those who have knowledge in this field and will not be further described or illustrated here.

Manufacture of Separator

EXAMPLE 1

97.5 wt % of a mixture of 60 wt % of a first polyethylene particle (Chemipearl W401, Mitsui Chemicals, Inc.) having a melting point of 110° C., a particle size of 1 μm, and a weight average molecular weight of 5,000 g/mol and 40 wt % of a second polyethylene particle (Chemipearl W100, Mitsui Chemicals, Inc.) having a melting point of 128° C., a particle size of 3 μm, and a weight average molecular weight of 20,000 g/mol were mixed with 2.5 wt % of an acryl-based rubber (BM-900B, ZEON Co.) and water, preparing an organic layer composition. In the foregoing, the 97.5 wt % of the mixture and the 2.5 wt % of the acryl-based rubber are based on the total weight of the mixture and the acryl-based rubber, and the 60 wt % of the first polyethylene particle and the 40 wt % of the second polyethylene particle are based on the total weight of the first polyethylene particle and the second polyethylene particle.

An inorganic layer composition was prepared by mixing 95 wt % of sheet-shaped AlO(OH) having a particle size of 0.9 μm (BMM Kawai Lime Co.) and 5 wt % of an acryl-based rubber (BM-900B, ZEON Co.) with water, with the wt % being based on the total weight of the sheet-shaped AlO(OH) and the acryl-based rubber.

The organic layer composition was coated on one side of a porous substrate having an average pore size of 0.05 μm and porosity of 45 volume %, and formed of a polyethylene material, to form an organic layer. The inorganic layer composition was coated on the other side of the substrate to form an inorganic layer, thereby manufacturing a separator. Here, the substrate was 9 μm thick, the organic layer was 4 μm thick, and the inorganic layer was 5 μm thick.

COMPARATIVE EXAMPLE 1

A separator was manufactured by coating the inorganic layer composition according to Example 1 on both sides of a porous substrate having an average pore size of 0.05 μm and porosity of 45 volume %, and formed of a polyethylene material, to form an inorganic layer. Here, the substrate was 9 μm thick, and the inorganic layer on both sides thereof was 5 μm thick in total.

COMPARATIVE EXAMPLE 2

An organic layer composition was prepared by mixing 97.5 wt % of a polyethylene particle (Chemipearl W401, Mitsui Chemicals, Inc.) having a melting point of 110° C., a particle size of 1 μm, and a weight average molecular weight of 5,000 g/mol, 2.5 wt % of an acryl-based rubber (BM-900B, ZEON Co.) and water, with the wt % being based on the total weight of the polyethylene particle and the acryl-based rubber.

The organic layer composition was coated on one side of a porous substrate having an average pore size of 0.05 μm and porosity of 45 volume %, and formed of a polyethylene material, to form an organic layer. The inorganic layer composition according to Example 1 was coated on the other side of the substrate to form an inorganic layer, manufacturing a separator. Here, the substrate was 9 μm thick, the organic layer was 4 μm thick, and the inorganic layer was 5 μm thick.

(Manufacture of Rechargeable Lithium Battery Cell)

94 wt % of a mixture of 90 wt % of $LiNi_{1/3}Co_{1/3}Mn_{1/3}O_2$ and 10 wt % of $LiNi_{0.8}Co_{0.15}Al_{0.05}O_2$ as a positive active material, 3 wt % of carbon black as a conductive material and 3 wt % of polyvinylidene fluoride as a binder were added to an N-methylpyrrolidone (NMP) solvent, preparing slurry. The slurry was coated on an aluminum (Al) thin film and then, dried and roll-pressed, manufacturing a positive electrode. In the foregoing, the 90 wt % of the mixture, the 3 wt % of the carbon black, and the 3 wt % of the polyvinylidene fluoride are based on the total weight of the mixture, the carbon black and the polyvinylidene fluoride. The 90 wt % of the $LiNi_{1/3}Co_{1/3}Mn_{1/3}O_2$ and the 10 wt % of $LiNi_{0.8}Co_{0.15}Al_{0.05}O_2$ are based on the total weight of the $LiNi_{1/3}Co_{1/3}Mn_{1/3}O_2$ and the $LiNi_{0.8}Co_{0.15}Al_{0.05}O_2$.

On the other hand, 97.5 wt % of graphite as a negative active material, 1.5 wt % of a styrene-butadiene rubber (SBR) as a binder, and 1 wt % of carboxylmethyl cellulose (CMC) were added to water as a solvent, preparing a slurry, with the wt % being based on the total amount of the negative active material, the SBR, and the CMC. The slurry was coated on a copper foil and then, dried and roll-pressed, thereby manufacturing a negative electrode.

An electrolyte solution was prepared by mixing ethylene carbonate, ethylmethyl carbonate and dimethyl carbonate to a volume ratio of 2:4:4 and adding 1.15 M $LiPF_6$ to the mixed solvent. The positive electrode, the negative electrode and the electrolyte solution were used along with each separator according to Example 1 and Comparative Examples 1 and 2, respectively, thereby manufacturing a rechargeable lithium battery cell.

Evaluation 1: Thermal Resistance of Separator

Figure 4:
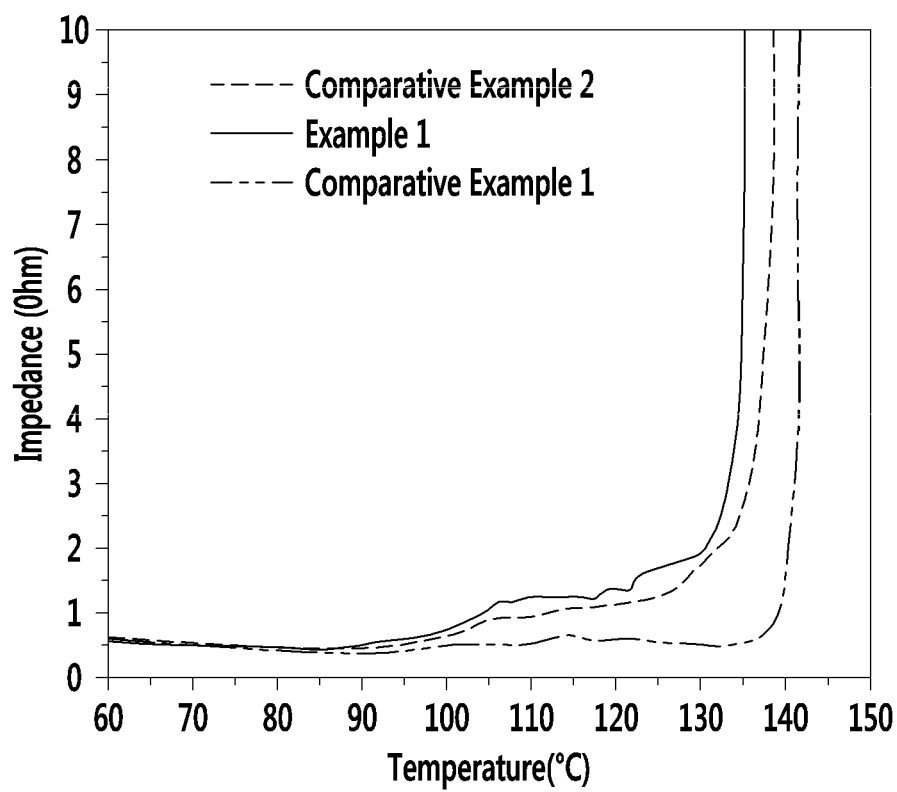
FIG. 4 is a graph showing a relationship between a temperature and resistance in each separator for a rechargeable lithium battery according to Example 1 and Comparative Examples 1 and 2.

Resistance change of the separators according to Example 1 and Comparative Examples 1 and 2 depending on a temperature was evaluated, and the results are provided in FIG. 4 and the following Table 1.

TABLE 1

| | Shut-down starting temperature (° C.) | |
| --- | --- | --- |
| | Primary (an organic material) | Secondary (substrate) |
| Example 1 | 91 | 128 |
| Comparative Example 1 | — | 134 |
| Comparative Example 2 | 98 | 132 |

FIG. 4 is a graph showing the relationship between temperature and resistance of the separators for rechargeable lithium battery cells according to Example 1 and Comparative Examples 1 and 2.

Referring to FIG. 4 and Table 1, the separator having an organic layer including two or more kinds of organic particles having different melting points from each other on at least one side of a substrate according to Example 1 showed a resistance increase at 91° C. and a lower secondary shut-down starting temperature organic layer than that according to Comparative Example 1, which did not include the organic layer, and that according to Comparative Example 2, which included one kind of an organic material. Referring to Example 1 and Comparative Example 2, even an organic layer is formed on the substrate, the separator including the organic layer including at least two kinds of the organic materials having a different melting point from each other showed a lower primary shut-down starting temperature as compared with the separator including the organic layer that included only one kind of an organic material.

Accordingly, the separator including an organic layer including at least two kinds of the organic materials having a different melting point from each other on at least one side of the separator reinforces shut-down functions and thereby exothermicity of a battery may be suppressed or reduced earlier (e.g., at a lower temperature).

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A separator for a rechargeable lithium battery, comprising:
    a substrate;
    an organic layer on one side of the substrate and comprising an organic material; and
    an inorganic layer on another side of the substrate and comprising an inorganic material,
    wherein the inorganic material comprises an inorganic particle comprising $Al(OH)_3$, $AlO(OH)$, $Mg(OH)_2$, $Ti(OH)_4$, aluminum nitride (AlN), silicon carbide (SiC), boron nitride (BN), or a mixture thereof,
    wherein the organic material comprises two or more organic particles having respective melting points that are different from each other,
    wherein the two or more organic particles comprise a first organic particle and a second organic particle, the melting point of the second organic particle being different from that of the first organic particle,
    wherein a melting point difference between the first organic particle and the second organic particle is 10° C. to 20° C.,
    wherein one of the melting points of the organic material is lower than that of the substrate and another of the melting points is 110° C. to 120° C.,
    wherein the melting point of the substrate is about 135° C. to about 140° C.,
    wherein one of the melting points of the organic material is 128° C. to about 130° C., and
    wherein the organic layer does not include an inorganic material.

2. The separator for a rechargeable lithium battery of claim 1, wherein the organic material comprises a polyolefin, a polyolefin derivative, a polyolefin wax, an acryl-based compound, or a mixture thereof.

3. The separator for a rechargeable lithium battery of claim 1, wherein the organic material has a particle size of about 0.1 μm to about 5 μm.

4. The separator for a rechargeable lithium battery of claim 1, wherein the inorganic material has a particle size of about 0.1 μm to about 5 μm.

5. The separator for a rechargeable lithium battery of claim 1, wherein the inorganic layer has a thickness of about 1 μm to about 10 μm, and
    the organic layer has a thickness of about 1 μm to about 10 μm.

6. The separator for a rechargeable lithium battery of claim 1, wherein at least one selected from the organic layer and the inorganic layer further comprises a binder, and
    the binder comprises a styrene-butadiene rubber (SBR), carboxylmethyl cellulose (CMC), polyvinylidene fluoride (PVdF), a polyvinylidene fluoride-hexafluoropropylene (PVdF-HFP) copolymer, ethylene vinylacetate (EVA), hydroxyethyl cellulose (HEC), polyvinyl alcohol (PVA), polyvinylbutyral (PVB), an ethylene-acrylic acid copolymer, acrylonitrile, a vinyl acetate derivative, polyethylene glycol, an acryl-based rubber, or a mixture thereof.

7. A rechargeable lithium battery comprising the separator of claim 1.

8. A separator for a rechargeable lithium battery, comprising:
    a substrate;
    an organic layer on one side of the substrate and comprising an organic material; and
    an inorganic layer on another side of the substrate and comprising an inorganic material,
    wherein the inorganic material comprises an inorganic particle comprising $Al(OH)_3$, $AlO(OH)$, $Mg(OH)_2$, $Ti(OH)_4$, aluminum nitride (AlN), silicon carbide (SiC), boron nitride (BN), or a mixture thereof,
    wherein the organic material comprises a first organic particle and a second organic particle,
    wherein a melting point of the first organic particle is about 110° C. to about 120° C. and a melting point of the second organic particle is lower than that of the substrate,
    wherein a melting point difference between the first organic particle and the second organic particle is about 10° C. to 20° C., and
    wherein the organic layer does not include the inorganic material.

* * * * *